United States Patent
Han et al.

(10) Patent No.: US 10,381,639 B2
(45) Date of Patent: *Aug. 13, 2019

(54) LITHIUM SECONDARY BATTERY

(71) Applicant: SK Innovation Co., Ltd., Seoul (KR)

(72) Inventors: Kook-Hyun Han, Daejeon (KR); Kyung-Bin Yoo, Daejeon (KR); Duck-Chul Hwang, Suwon-si (KR)

(73) Assignee: SK INNOVATION CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/178,606

(22) Filed: Jun. 10, 2016

(65) Prior Publication Data

US 2016/0365570 A1   Dec. 15, 2016

(30) Foreign Application Priority Data

Jun. 11, 2015 (KR) .................. 10-2015-0082639

(51) Int. Cl.
| | | |
|---|---|---|
| *H01M 4/36* | (2006.01) | |
| *H01M 2/16* | (2006.01) | |
| *H01M 4/485* | (2010.01) | |
| *H01M 10/0525* | (2010.01) | |
| *H01M 4/131* | (2010.01) | |
| *H01M 4/02* | (2006.01) | |

(52) U.S. Cl.
CPC .......... *H01M 4/364* (2013.01); *H01M 2/1646* (2013.01); *H01M 2/1686* (2013.01); *H01M 4/131* (2013.01); *H01M 4/485* (2013.01); *H01M 10/0525* (2013.01); *H01M 2004/021* (2013.01); *H01M 2004/028* (2013.01); *Y02T 10/7011* (2013.01)

(58) Field of Classification Search
CPC ............. H01M 2/1686; H01M 10/052; H01M 10/0525; H01M 4/131; H01M 4/485; H01M 4/505; H01M 4/525; H01M 4/1391

See application file for complete search history.

(56) References Cited

U.S. PATENT DOCUMENTS

| | | | |
|---|---|---|---|
| 2007/0254209 A1* | 11/2007 | Baba | H01M 2/14 429/129 |
| 2009/0068561 A1* | 3/2009 | Sun | H01M 4/131 429/223 |
| 2010/0015514 A1 | 1/2010 | Miyagi et al. | |
| 2011/0052980 A1* | 3/2011 | Sakata | H01M 4/131 429/199 |
| 2013/0260231 A1 | 10/2013 | Hua et al. | |
| 2014/0027670 A1* | 1/2014 | Sun | H01M 4/483 252/182.1 |
| 2014/0087266 A1 | 3/2014 | Li et al. | |
| 2014/0158932 A1* | 6/2014 | Sun | H01M 4/13 252/182.1 |

FOREIGN PATENT DOCUMENTS

| | | | |
|---|---|---|---|
| CN | 101038960 A | 9/2007 | |
| CN | 103370818 A | 10/2013 | |
| KR | 1020060134631 A | 12/2006 | |
| KR | 1020140118517 A | 10/2014 | |
| WO | WO-2012093797 A2 * | 7/2012 | ............ H01M 4/364 |
| WO | WO 2013183974 A1 * | 12/2013 | ............ H01M 4/13 |

* cited by examiner

Primary Examiner — Jimmy Vo

(74) Attorney, Agent, or Firm — The PL Law Group, PLLC

(57) ABSTRACT

A lithium secondary battery including a cathode, an anode, and a separation film installed between the cathode and the anode, wherein the cathode includes a cathode active material containing lithium-metal oxide of which at least one of the metals has a continuous concentration gradient region between a core part and a surface part thereof, and the separation film includes a base film, and a ceramic coating layer formed on at least one surface of the base film, such that the lifespan property is significantly improved, while exhibiting excellent penetration safety.

11 Claims, No Drawings

LITHIUM SECONDARY BATTERY

BACKGROUND OF THE INVENTION

1. Field of the Invention

The present invention relates to a lithium secondary battery, and more specifically, to a lithium secondary battery which has excellent life span property and penetration safety.

2. Description of the Related Art

With rapid progress of electronic, telecommunication and computer industries, portable electronic communication devices such as a camcorder, mobile phone, notebook PC, etc. have been remarkably developed. Accordingly, the demand for a lithium secondary battery as a power source capable of driving the above device is also increased. In particular, with regard to applications of eco-friendly power sources such as an electric car, uninterruptible power supply, electromotive tool and satellite, research and development have been actively proceeded in domestic field and other countries such as Japan, Europe, United States, etc.

Among currently used secondary batteries, the lithium secondary battery developed since early 1990's includes an anode made of a carbon material capable of absorbing and desorbing lithium ions, a cathode made of lithium-containing oxide, and a non-aqueous electrolyte containing lithium salt dissolved in a mixed organic solvent in a suitable amount.

In this regard, as the application of the lithium secondary battery is more enlarged, a case that the lithium secondary battery should be used even under more severe environments is increased.

However, lithium transition metal oxide or composite oxide used as a cathode active material of the lithium secondary battery entails a problem that a metal component is desorbed from the cathode during storage at a high temperature under fully charged condition, hence being in thermally unstable state. In addition, when a forced internal short circuit occurs due to an external impact, a heating value inside the battery is rapidly increased, thereby causing ignition.

In order to solve the above problems, Korean Patent Laid-Open Publication No. 2006-0134631 discloses a cathode active material having a core-shell structure in which a core part and a shell part are made of lithium transition metal oxides different from each other, however, still has lack of improvement in life-span property and safety of the battery.

SUMMARY OF THE INVENTION

Accordingly, it is an object of the present invention to provide a lithium secondary battery which has excellent life-span property and penetration safety.

In order to achieve the above object, according to one aspect of the present invention, there is provided a lithium secondary battery including a cathode, an anode, and a separation film installed between the cathode and the anode, wherein the cathode includes a cathode active material containing lithium-metal oxide of which at least one of metals has a continuous concentration gradient region between a core part and a surface part thereof, and the separation film includes a base film, and a ceramic coating layer formed on at least one surface of the base film.

In the lithium secondary battery according to one embodiment of the present invention, another of the metals included in the lithium-metal oxide may have a constant concentration between the core part and the surface part.

In the lithium secondary battery according to one embodiment of the present invention, the lithium-metal oxide may include a first metal having a concentration gradient region with increased concentration between the core part and the surface part, and a second metal having a concentration gradient region with decreased concentration between the core part and the surface part.

In the lithium secondary battery according to one embodiment of the present invention, the lithium-metal oxide may be represented by Formula 1 below, and at least one of M1, M2 and M3 may have a continuous concentration gradient between the core part and the surface part:

$$Li_xM1_aM2_bM3_cO_y$$ [Formula 1]

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and $0 < x \leq 1.1$, $2 \leq y \leq 2.02$, $0 \leq a \leq 1$, $0 \leq b \leq 1$, $0 \leq c \leq 1$, and $0 < a+b+c \leq 1$).

In the lithium secondary battery according to one embodiment of the present invention, at least one of the M1, M2 and M3 may have a concentration gradient region with increased concentration between the core part and the surface part, while the others may have a concentration gradient region with decreased concentration between the core part and the surface part.

In the lithium secondary battery according to one embodiment of the present invention, at least one of the M1, M2 and M3 may have a concentration gradient region with increased concentration between the core part and the surface part, another may have a concentration gradient region with decreased concentration between the core part and the surface part, and the other may have a constant concentration between the core part and the surface part.

In the lithium secondary battery according to one embodiment of the present invention, the M1, M2 and M3 may be Ni, Co and Mn, respectively.

In the lithium secondary battery according to one embodiment of the present invention, the M1 may be Ni, and $0.6 \leq a \leq 0.95$ and $0.05 \leq b+c \leq 0.4$.

In the lithium secondary battery according to one embodiment of the present invention, the M1 may be Ni, and $0.7 \leq a \leq 0.9$ and $0.1 \leq b+c \leq 0.3$.

In the lithium secondary battery according to one embodiment of the present invention, the ceramic coating layer may include ceramic powders having an average particle diameter of 0.01 to 2.0 μm.

In the lithium secondary battery according to one embodiment of the present invention, the ceramic coating layer may include the ceramic powders in an amount of 80 to 97% by weight to a total weight of the ceramic coating layer.

In the lithium secondary battery according to one embodiment of the present invention, the ceramic coating layer may include metal oxide containing at least one metal selected from a group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cerium (Ce).

In the lithium secondary battery according to one embodiment of the present invention, the ceramic coating layer may include at least one selected from a group consisting of $Al_2O_3$, $TiO_2$, $ZrO_2$, $Y_2O_3$, ZnO, CaO, NiO, MgO, $SiO_2$, SiC, Al(OH)$_3$, AlO(OH), BaTiO$_3$, PbTiO$_3$, PZT, PLZT, PMN-PT, HfO$_2$, SrTiO$_3$, SnO$_3$ and CeO$_2$, as the ceramic powders.

In the lithium secondary battery according to one embodiment of the present invention, the ceramic coating layer formed on one surface of the separation film may have a thickness of 2 to 10 μm.

In the lithium secondary battery according to one embodiment of the present invention, the ceramic coating layers may have a sum of total thickness of 4 to 20 μm.

The lithium secondary battery according to the present invention includes a combination of the cathode active material containing the metal having the continuous concentration gradient and the separation film having the ceramic coating layer formed thereon, such that it is possible to achieve a significantly improved effect in both of the lifespan property and penetration safety.

DETAILED DESCRIPTION OF THE INVENTION

The present invention disclose a lithium secondary battery including a cathode, an anode, and a separation film installed between the cathode and the anode, wherein the cathode includes a cathode active material containing lithium-metal oxide of which at least one of metals has a continuous concentration gradient region between a core part and a surface part thereof, and the separation film includes a base film, and a ceramic coating layer formed on at least one surface of the base film, such that lifespan property is significantly improved, while exhibiting excellent penetration safety.

Hereinafter, the present invention will be described in more detail.

The present invention relates to a lithium secondary battery including a cathode coated with a cathode active material, an anode coated with an anode active material, and a separation film which is installed between the cathode and the anode and has a ceramic coating layer formed thereon.

Cathode

The cathode according to the present invention includes the cathode active material containing lithium-metal oxide which has a specific concentration gradient.

The cathode active material used in the present invention includes lithium-metal oxide of which at least one of metals has a continuous concentration gradient between a core part and a surface part thereof. Such a cathode active material exhibits superior life-span property, compared to a cathode active material without a change in concentration.

In the present invention, the fact that the metal of the lithium-metal oxide has a continuous concentration gradient region between the core part and the surface part, means that other metals except for lithium may have a concentration distribution region varying in a constant tendency between a core part and a surface part of a lithium-metal oxide particle. The constant tendency means that a development of the entire concentration change is decreased or increased, however, does not exclude that a value opposed to the above tendency may be represent at a position.

In the present invention, the core part of the particle means an area within 0.2 μm radius from a center of the active material particle, while the surface part means an area within 0.2 μm from the outmost portion of the particle.

The cathode active material according to the present invention may include at least one of metals having a concentration gradient. Therefore, as one embodiment, the cathode active material may include a first metal having a concentration gradient region with increased concentration between the core part and the surface part, and a second metal having a concentration gradient region with decreased concentration between the core part and the surface part. The first metal or second metal may be independently at least one of metals.

As another embodiment of the present invention, the cathode active material according to the present invention may include a metal having a constant concentration between the core part and the surface part, among the metals forming the lithium-metal oxide.

A specific example of the cathode active material according to the present invention may include lithium-metal oxide represented by Formula 1 below, wherein at least one of M1, M2 and M3 has a continuous concentration gradient between the core part and the surface part:

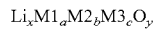
[Formula 1]

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and 0<x≤1.1, 2≤y≤2.02, 0≤a≤1, 0≤b≤1, 0≤c≤1, and 0<a+b+c≤1).

According to one embodiment of the present invention, at least one of M1, M2 and M3 may have a concentration gradient region with increased concentration between the core part and the surface part, while the others may have a concentration gradient region with decreased concentration between the core part and the surface part.

According to another embodiment of the present invention, at least one of M1, M2 and M3 may have a concentration gradient region with increased concentration between the core part and the surface part, another may have a concentration gradient region with decreased concentration between the core part and the surface part, and the other may have a constant concentration between the core part and the surface part.

As a specific example of the present invention, M1, M2 and M3 may be Ni, Co and Mn, respectively.

The lithium-metal oxide according to the present invention may have a relatively higher content of nickel (Ni). Using Ni may be helpful for improving a capacity of the battery. For a structure of the conventional cathode active material, if a content of Ni is high, life-span is reduced. However, in a case of the cathode active material according to the present invention, the life-span property is not deteriorated even if it has a high content of Ni. Therefore, the cathode active material of the present invention may exhibit excellent life-span property while maintaining a high capacity.

For example, with regard to the lithium-metal oxide according to the present invention, a molar ratio of Ni may range from 0.6 to 0.95, and preferably, 0.7 to 0.9. That is, if M1 is Ni in the above Formula 1, it may be 0.6≤a≤0.95 and 0.05≤b+c≤0.4, and preferably, 0.7≤a≤0.9 and 0.1≤b+c≤0.3.

A particle shape of the lithium-metal oxide according to the present invention is not particularly limited, but a first particle thereof preferably has a rod-type shape.

A particle size of the lithium-metal oxide according to the present invention is not particularly limited, and may be a range of 3 to 20 μm, for example.

The cathode active material according to the present invention may further include a coating layer on the above-described lithium-metal oxide. The coating layer may be made of a metal or metal oxide including, for example, Al, Ti, Ba, Zr, Si, B, Mg and P, and alloys thereof or oxides of the above metal.

As necessary, the cathode active material according to the present invention may include a configuration in which the above-described lithium-metal oxide is doped with metals or metal oxides. Such a doping metal may include, for example, Al, Ti, Ba, Zr, Si, B, Mg and P, and alloys thereof or oxides of the above metal.

The lithium-metal oxide according to the present invention may be prepared by co-precipitation.

Hereinafter, a method for preparing a cathode active material according to one embodiment of the present invention will be described.

First, metal precursor solutions having different concentrations from each other are prepared. The metal precursor solution is a solution containing a precursor of at least one metal to be contained in the cathode active material. For example, the metal precursor may generally include halides, hydroxides, acid salts of metal, or the like.

To fabricate the metal precursor solution, a precursor solution having a concentration corresponding to constitutional compositions of the center part of the cathode active material and a precursor solution having a concentration corresponding to constitutional compositions of the surface part of the cathode active material are respectively prepared, to obtain two precursor solutions. For example, when fabricating a cathode active material of metal oxide containing nickel, manganese and cobalt other than lithium, a precursor solution having a concentration of nickel, manganese and cobalt corresponding to the constitutional compositions of the center part of the cathode active material and a precursor solution having a concentration of nickel, manganese and cobalt corresponding to the constitutional compositions of the surface part of the cathode active material are respectively prepared.

Next, the prepared two metal precursor solutions are mixed to form a precipitate. During mixing the above solutions, a mixing ratio of the two metal precursor solutions is continuously changed so as to correspond to the concentration gradient in a required active material. Accordingly, the precipitate has a concentration of metal corresponding to the concentration gradient in the active material. In this case, precipitation may be performed by adding a chelating agent and bases during mixing the above solutions.

After the prepared precipitate is subjected to heat treatment, if it is mixed with a lithium salt and the mixture is again subjected to heat treatment, a cathode active material according to the present invention may be obtained.

The cathode according to the present invention may be formed by adding a solvent and, optionally, a binder, conductive material, dispersant, etc. to the cathode active material, and agitating the same to prepare a cathode slurry, then applying (coating) the slurry to a collector made of a metal material, and drying and pressing the same.

The binder may include any one commonly used in the related art without particular limitation thereof. For example, an organic binder such as vinylidene fluoride-hexafluoropropylene copolymer (PVDF-co-HFP), polyvinylidene fluoride (PVDF), polyacrylonitrile, polymethyl methacrylate, etc.; or an aqueous binder such as styrene-butadiene rubber (SBR), etc., may be used together with a thickener such as carboxymethyl cellulose (CMC).

The conductive material may include any conductive carbon substance generally used in the related art without particular limitation thereof.

The collector made of a metal material is a metal having high conductivity and being easily attached with the slurry of the cathode or anode active material. The metal used herein may include any one if it does not have reactivity in the voltage range of the battery. As non-limited examples, the cathode collector may include aluminum, nickel, or a foil made of a combination thereof. As the non-limited examples, the anode collector may include copper, gold, nickel or a copper alloy, or a foil made of a combination thereof.

Anode

The anode according to the present invention may include any anode generally used in the related art without particular limitation thereof.

The anode active material useable in the present invention may include any material known in the related art, so long as it can absorb and desorb lithium ions, without particular limitation thereof. For example, carbon materials such as crystalline carbon, amorphous carbon, carbon composite, carbon fiber, etc., lithium metal, alloys of lithium and other elements, silicon, or tin may be used. The amorphous carbon may include, for example, hard carbon, cokes, mesocarbon microbead (MCMB) calcined at a temperature of 1500° C. or less, mesophase pitch-based carbon fiber (MPCF), or the like. The crystalline carbon may include graphite materials, and specifically, natural graphite, graphite cokes, graphite MCMB, graphite MPCF, or the like. Other elements used together with lithium to form an alloy thereof may include, for example, aluminum, zinc, bismuth, cadmium, antimony, silicone, lead, tin, gallium or indium.

A size of the graphite used in the present invention is not particularly limited, but the graphite may have an average particle diameter of 5 to 30 μm.

The anode according to the present invention may be formed by adding a solvent and, optionally, a binder, conductive material, dispersant, etc. to the above-described anode active material, and agitating the same to prepare an anode slurry, then applying (coating) the slurry to a collector made of a metal material, and drying and pressing the same. In this case, the solvent, binder, conductive material, dispersant, etc. may use the same material as the above-described cathode, and may apply the same forming method as thereof.

Separation Film

The separation film according to the present invention is installed between the cathode and the anode to play a role of insulating the same from each other, and may include a ceramic coating layer formed on at least one surface thereof.

The lithium secondary battery according to the present invention uses the separation film having the ceramic coating layer together with the cathode coated with the above-described cathode active material, such that it is possible to exhibit superior life-span property, compared to a cathode having the same composition constitutional composition without a concentration gradient, and significantly improve safety for a penetration evaluation, even if a separation film having a ceramic coating layer with a relatively thinner thickness is used.

In regard of the penetration evaluation, if an external impact is applied to the secondary battery to be penetrated, a heating value at the penetrated portion thereof is rapidly increased. Thereby, the separation film inside the battery may be contracted, and two electrodes of cathode and anode are exposed to an outside to cause a short circuit between the electrodes, and thereby become more likely to be additionally ignited and exploded. On the other hand, the secondary battery according to the present invention uses the above-described cathode active material together with the separation film having the ceramic coating layer, such that it is possible to prevent the separation film inside the battery from being contracted, so as to significantly improve the safety (safety in penetration evaluation).

The separation film according to the present invention may include a base film, and a ceramic coating layer formed by applying a ceramic coating composition containing ceramic powders to at least one surface of the base film.

The base film useable in the present invention may include a conventional porous polymer film, for example, a porous polymer film made of a polyolefin polymer such as ethylene homopolymer, propylene homopolymer, ethylene/butene copolymer, ethylene/hexene copolymer or ethylene/methacrylate copolymer, which may be used alone or as a laminate formed by stacking up the same. Otherwise, conventional porous woven fabrics, for example, a woven fabric made of high-melting point glass fiber, polyethylene terephthalate fiber, etc., may be used, but it is not particularly limited thereto. The base film may be applied to a battery by any general method such as winding. Besides, lamination (stacking) and folding of a separator and the electrodes may also be used.

The ceramic powders useable in the present invention may have an average particle diameter of 0.01 to 2.0 µm, preferably, 0.3 to 1.5 µm. Within the above range, dispersion characteristics may be suitably maintained.

The ceramic powders may be oxides containing at least one metal selected from a group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cerium (Ce). Specifically, the metal oxide of the ceramic powders may include at least one selected from a group consisting of $Al_2O_3$, $TiO_2$, $ZrO_2$, $Y_2O_3$, $ZnO$, $CaO$, $NiO$, $MgO$, $SiO_2$, $SiC$, $Al(OH)_3$, $AlO(OH)$, $BaTiO_3$, $PbTiO_3$, PZT, PLZT, PMN-PT, $HfO_2$, $SrTiO_3$, $SnO_3$ and $CeO_2$, but it is not limited thereto. These oxides may be used alone or in combination of two or more thereof.

The ceramic powders may be included in an amount of 80 to 97% by weight ('wt. %') to a total weight of the ceramic coating layer, and preferably 90 to 95 wt. %. Within the above range, dispersion characteristics may be suitably maintained.

The ceramic coating composition according to the present invention may include a binder resin, a solvent, other additives, etc. other than the ceramic powders.

Preferably, the binder resin useable in the present invention includes a polymer resin with a high thermal resistance, and may include, for example, any one selected from polyphenyl sulfone, polyarylate, polyether sulfone, polyamide imde, polybenzimidazol, or a mixture of two or more thereof.

The solvent useable in the present invention may include at least one selected from tetrachloroethane, methylene chloride, chloroform, 1,1,2-trichloroethane, tetrahydrofuran, 1,4-dioxane, chlorobenzene, cyclohexanone, dimethylformamide, acetone, dimethylacetamide, dimethylsulfoxide, N-methyl-2-pyrrolidone, which may be used alone or in combination of two or more thereof.

A method of forming the ceramic coating layer according to the present invention is not particularly limited but may use, for example, bar coating, rod coating, die coating, wire coating, comma coating, micro gravure/gravure coating, dip coating, spray coating and spin coating, and mixed and modified methods thereof.

A thickness of the ceramic coating layer according to the present invention is not particularly limited but may be 2 to 10 µm, and preferably, 2 to 7 µm. Within the above range, it is possible to prevent the separation film from being contracted during penetrating the ceramic coating layer, thereby the penetration safety of the battery may be more improved, and a rapid decrease in life span may be effectively suppressed.

In addition, the ceramic coating layer according to the present invention may be formed on at least one surface of the base film. When the ceramic coating layers are formed on opposite surfaces of the base film, the ceramic coating layers may have a sum of total thickness of 4 to 20 µm.

The secondary battery may further include a non-aqueous electrolyte, and the non-aqueous electrolyte may include lithium salt which is an electrolyte and an organic solvent. The lithium salt may include any one typically used for a lithium secondary battery electrolyte without particular limitation thereof. Representative examples of the organic solvent may include any one selected from a group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, and tetrahydrofurane, or a mixture of two or more thereof.

The non-aqueous electrolyte may be introduced into an electrode structure including a cathode, an anode, and a separation film installed between the cathode and the anode, so as to fabricate a lithium secondary battery.

An appearance of the lithium secondary battery of the present invention is not particularly limited, but may include, for example, a cylindrical or square form using a can, a pouch type or a coin type.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE 1

<Cathode>

Lithium-metal oxide (hereinafter, FCG) with a whole composition of $LiNi_{0.8}Co_{0.1}Mn_{0.1}O_2$, a core part composition of $LiNi_{0.84}Co_{0.11}Mn_{0.05}O_2$ and a surface part composition of $LiNi_{0.78}Co_{0.10}Mn_{0.12}O_2$, having a concentration gradient between the core part and the surface part as a cathode active material, Denka Black as a conductive material, and PVDF as a binder were used in a weight ratio of 92:5:3, respectively, to prepare a cathode slurry. Thereafter, the slurry was applied to an aluminum substrate to coat the same, followed by drying and pressing to prepare a cathode.

For reference, the concentration gradient of the prepared lithium-metal oxide is listed in Table 1 below. For the lithium-metal oxide particle with a distance between a core of a particle to the surface thereof, that is, 5 µm, the measurement sites were present at an interval of 5/7 µm from the surface.

TABLE 1

| Site | Ni | Mn | Co |
|---|---|---|---|
| 1 | 77.97 | 11.96 | 10.07 |
| 2 | 80.98 | 9.29 | 9.73 |
| 3 | 82.68 | 7.00 | 10.32 |

TABLE 1-continued

| Site | Ni | Mn | Co |
|---|---|---|---|
| 4 | 82.60 | 7.40 | 10.00 |
| 5 | 82.55 | 7.07 | 10.37 |
| 6 | 83.24 | 5.90 | 10.86 |
| 7 | 84.33 | 4.84 | 10.83 |

<Anode>

An anode slurry including 92 wt. % of natural graphite as an anode active material, 5 wt. % of a flake type conductive material, that is, KS6 as a conductive material, 1 wt. % of SBR as a binder, and 1 wt. % of CMC as a thickener was applied to a copper substrate, followed by drying and pressing to prepare an anode.

<Separation Film>

Ceramic coating layers (A-1) including boehmite (AlO(OH)) and an acrylate binder in a weight ratio of 90:10 were respectively formed on upper and lower surfaces of polyethylene fabric having a thickness of 16 μm, so as to reach a thickness of 1 μm.

<Battery>

By notching both of a cathode plate and an anode plate in a suitable size, respectively, laminating the same, and installing a separation film between the cathode plate and the anode plate, a cell was fabricated. Tap parts of the cathode and the anode were welded, respectively. A combination of the welded cathode/separation film/anode was put into a pouch, followed by sealing three sides of the pouch except one side into which an electrolyte is injected. In this case, a portion having the tap is included in the sealing portion. After injecting the electrolyte through the remaining one side, the one side was also sealed, followed by impregnation for 12 hours or more. The electrolyte used herein was formed by preparing 1M $LiPF_6$ solution with a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

After then, pre-charging was conducted with a current (2.5 A) corresponding to 0.25 C for 36 minutes. After 1 hour, degassing and then aging were conducted for 24 hours or more, followed by chemical charging-discharging (charge condition: CC-CV 0.2 C 4.2 V 0.05 C CUT-OFF; discharge condition: CC 0.2 C 2.5 V CUT-OFF). Thereafter, standard charging-discharging was conducted (charge condition: CC-CV 0.5 C 4.2 V 0.05 C CUT-OFF; discharge condition: CC 0.5 C 2.5 V CUT-OFF).

COMPARATIVE EXAMPLE 1

The same procedures as described in Example 1 were conducted to fabricate a cell except that $LiNi_{0.8}Co_{0.1}Mn_{0.1}O_2$ (hereinafter, NCM811) having a uniform composition throughout particles was used as a cathode active material, to prepare a battery.

EXAMPLES 2 TO 13 AND COMPARATIVE EXAMPLES 2 TO 6

The same procedures as described in Example 1 were conducted to prepare batteries, except that the batteries have compositions and thicknesses in a range listed in Table 2 below.

TABLE 2

| Section | Cathode active material (composition) | Ceramic coating layer (composition/thickness μm) | Base film (composition/thickness μm) | Ceramic coating layer (composition/thickness μm) |
|---|---|---|---|---|
| Example 1 | FCG | A-1/1 | PE/16 | A-1/1 |
| Example 2 | FCG | A-1/2 | PE/16 | A-1/2 |
| Example 3 | FCG | A-1/3 | PE/16 | A-1/3 |
| Example 4 | FCG | A-1/5 | PE/16 | A-1/5 |
| Example 5 | FCG | A-1/7 | PE/16 | A-1/7 |
| Example 6 | FCG | A-1/10 | PE/16 | A-1/10 |
| Example 7 | FCG | A-1/2 | PE/16 | — |
| Example 8 | FCG | A-1/4 | PE/16 | — |
| Example 9 | FCG | A-1/6 | PE/16 | — |
| Example 10 | FCG | A-1/10 | PE/16 | — |
| Example 11 | FCG | A-1/14 | PE/16 | — |
| Example 12 | FCG | A-1/20 | PE/16 | — |
| Example 13 | FCG | A-2/2 | PE/16 | A-2/2 |
| Comparative Example 1 | NCM811 | A-1/1 | PE/16 | A-1/1 |
| Comparative Example 2 | NCM811 | A-1/2 | PE/16 | A-1/2 |
| Comparative Example 3 | NCM811 | A-1/3 | PE/16 | A-1/3 |
| Comparative Example 4 | NCM811 | A-1/5 | PE/16 | A-1/5 |
| Comparative Example 5 | NCM811 | A-1/7 | PE/16 | A-1/7 |
| Comparative Example 6 | NCM811 | A-1/10 | PE/16 | A-1/10 |

A-1: ceramic coating layer using boehmite of Example 1
A-2: ceramic coating layer using $Al(OH)_3$ instead of boehmite in Example 1

Test Procedure

1. Life-Span Property at Room Temperature

After repeating the charging (CC-CV 2.0 C 4.2 V 0.05 C CUT-OFF) and discharging (CC 2.0 C 2.75 V CUT-OFF) with the cell prepared in each of the examples and comparative examples 500 times, the discharge capacity at 500 times was calculated in % to a discharge capacity at 1 time, thus determining life-span property at room temperature.

Results thereof are shown in Table 3 below.

2. Evaluation of Penetration Safety

The battery prepared in each of the examples and comparative examples was penetrated with a nail from an outside, to confirm whether the battery was ignited or exploded.

Results thereof are shown in Table 3 below.

TABLE 3

| Section | Life-span (%) (500 cycle) | Penetration safety |
|---|---|---|
| Example 1 | 80 | Ignited |
| Example 2 | 80 | Non-ignited |
| Example 3 | 80 | Non-ignited |
| Example 4 | 79 | Non-ignited |
| Example 5 | 77 | Non-ignited |
| Example 6 | 70 | Non-ignited |
| Example 7 | 80 | Ignited |
| Example 8 | 80 | Non-ignited |
| Example 9 | 80 | Non-ignited |
| Example 10 | 79 | Non-ignited |
| Example 11 | 78 | Non-ignited |
| Example 12 | 74 | Non-ignited |
| Example 13 | 79 | Non-ignited |
| Comparative Example 1 | 70 | Ignited |
| Comparative Example 2 | 68 | Ignited |
| Comparative Example 3 | 65 | Ignited |
| Comparative | 60 | Non-ignited |

TABLE 3-continued

| Section | Life-span (%) (500 cycle) | Penetration safety |
|---|---|---|
| Example 4 | | |
| Comparative Example 5 | 55 | Non-ignited |
| Comparative Example 6 | 50 | Non-ignited |

Referring to the above Table 3, it can be seen that the batteries of the examples generally exhibit superior life-span property and penetration safety, compared to those of the comparative examples.

Specifically, comparing Examples 1 to 6 with Comparative Examples 1 to 6 including the ceramic coating layers having the same thickness as each other, it can be seen that, when using the cathode active material according to the present invention, the batteries were not ignited during the evaluation of penetration from the case that the ceramic coating layer has a total thickness of 4 μm, but when using the cathode active material different from the present invention, the batteries were ignited during the evaluation of penetration, except for the case that the ceramic coating layer has a total thickness of 10 μm or more.

In addition, it can be seen that, when using the cathode active material having a uniform composition, as the thickness of the ceramic coating layer was increased, the life-span property was significantly reduced, but when using the cathode active material according to the present invention, even if the thickness of the ceramic coating layer was increased, excellent life-span property was exhibited without significantly affecting the same.

What is claimed is:

1. A lithium secondary battery, comprising a cathode, an anode, and a separation film installed between the cathode and the anode,
wherein the separation film includes a base film, and a ceramic coating layer formed on at least one surface of the base film,
wherein the cathode includes:
a cathode active material consisting of:
one or more lithium metal oxides containing Ni, Co, and Mn, at least one of the lithium metal oxides includes a compound represented by Formula 1:

$Li_xM1_aM2_bM3_cO_y$, [Formula 1]

where $0<x\leq1.1$, $2\leq y\leq2.02$, $0<a<1$, $0<b<1$, $0<c<1$, and $0<a+b+c\leq1$;
optionally including a coating layer or dopant including a metal, metal oxide, or alloy including Al, Ti, Ba, Zr, Si, B, or Mg, and
M3 is Mn and has a concentration gradient range in which a concentration increases continuously from a core part of the cathode active material to a surface of the cathode active material;
M1 is Ni and has a concentration gradient range in which a concentration decreases continuously from the core part of the cathode active material to the surface of the cathode active material; and
M2 is Co and has a constant concentration from the core part of the cathode active material to the surface of the cathode active material; and
a of Formula 1 is 0.7797 or more throughout an entire region of the cathode active material,
wherein the ceramic coating layer formed on said at least one surface of the base film has a thickness of 2 to 20 μm.

2. The lithium secondary battery according to claim 1, wherein a of Formula 1 is within a range from 0.7797 to 0.9 throughout the entire region of the cathode active material.

3. The lithium secondary battery according to claim 1, wherein a of Formula 1 is within a range from 0.7797 to 0.9 throughout the entire region of the cathode active material, and $0.05\leq b+c\leq0.4$.

4. The lithium secondary battery according to claim 3, wherein a ceramic coating comprising a plurality of the ceramic coating layer formed on said at least one surface of the base film has a thickness of 4 to 20.

5. A lithium secondary battery, comprising a cathode, an anode, and a separation film installed between the cathode and the anode,
wherein the separation film includes a base film, and a ceramic coating layer formed on at least one surface of the base film; and
the cathode includes a cathode active material consisting of one or more lithium metal oxides containing Ni, Co, and Mn, at least one of the lithium metal oxides includes a compound represented by Formula 1, $Li_xM1_aM2_bM3_cO_y$, [Formula 1]

where $0<x\leq1.1$, $2\leq y\leq2.02$, $0<a<1$, $0<b<1$, $0<c<1$, and $0<a+b+c\leq1$;
M3 is Mn and has a concentration gradient range in which a concentration increases continuously from a core part of the cathode active material to a surface of the cathode active material;
M1 is Ni and has a concentration gradient range in which a concentration decreases continuously from the core part of the cathode active material to the surface of the cathode active material, wherein a of Formula 1 is 0.7797 or more throughout an entire region of the cathode active material; and
M2 is Co and has a constant concentration from the core part of the cathode active material to the surface of the cathode active material,
wherein the ceramic coating layer formed on said at least one surface of the base film has a thickness of 2 to 10 μm.

6. The lithium secondary battery according to claim 5, wherein the concentration of Ni is within a range from 0.7797 to 0.9 throughout the entire region of the cathode active material, and $0.05\leq b+c\leq0.4$.

7. The lithium secondary battery according to claim 5, wherein the ceramic coating layer includes ceramic powders having an average particle diameter of 0.01 to 2.0 μm.

8. The lithium secondary battery according to claim 5, wherein the ceramic coating layer includes the ceramic powders in an amount of 80 to 97% by weight to a total weight of the ceramic coating layer.

9. The lithium secondary battery according to claim 5, wherein the ceramic coating layer includes metal oxide containing at least one metal selected from a group consisting of aluminum (Al), titanium (Ti), zirconium (Zr), barium (Ba), magnesium (Mg), boron (B), yttrium (Y), zinc (Zn), calcium (Ca), nickel (Ni), silicon (Si), lead (Pb), strontium (Sr), tin (Sn) and cerium (Ce).

10. The lithium secondary battery according to claim 5, wherein the ceramic coating layer includes at least one selected from a group consisting of $Al_2O_3$, $TiO_2$, $ZrO_2$, $Y_2O_3$, ZnO, CaO, NiO, MgO, Sift, SiC, $Al(OH)_3$, AlO(OH), $BaTiO_3$, $PbTiO_3$, PZT, PLZT, PMNPT, $HfO_2$, $SrTiO_3$, $SnO_3$ and $CeO_2$, as the ceramic powders.

11. The lithium secondary battery according to claim 5, wherein a ceramic coating comprising a plurality of the ceramic coating layer formed on said at least one surface of the base film has a thickness of 4 to 20.

* * * * *